April 25, 1950     W. W. BENDER, JR., ET AL     2,505,601
APPARATUS FOR CALIBRATING VIBRATION EQUIPMENT
Filed July 31, 1945     3 Sheets-Sheet 1

INVENTORS
WELCOME W. BENDER JR.
WILLIAM B. BERGEN
WILLIAM G. PURDY
BY
ATTORNEY

April 25, 1950 W. W. BENDER, JR., ET AL 2,505,601
APPARATUS FOR CALIBRATING VIBRATION EQUIPMENT
Filed July 31, 1945 3 Sheets-Sheet 3

*INVENTORS*
WELCOME W. BENDER JR.
WILLIAM B. BERGEN
WILLIAM G. PURDY
BY
*Donald W. Torrington*
ATTORNEY Patented Apr. 25, 1950

2,505,601

UNITED STATES PATENT OFFICE 2,505,601

APPARATUS FOR CALIBRATING VIBRATION EQUIPMENT

Welcome W. Bender, Jr., Baltimore, William B. Bergen, Glen Arm, and William G. Purdy, Baltimore, Md., assignors to The Glenn L. Martin Company, Middle River, Md., a corporation of Maryland Application July 31, 1945, Serial No. 608,022

6 Claims. (Cl. 74—50)

Our invention is directed to vibration measuring equipment and more particularly to a method and an apparatus for calibrating a vibration pick-up unit.

The efficient high performance of the aircraft of today is greatly due to the development of accurate flight test equipment now widely used to determine the magnitude and occurrence of critical structural vibrations incurred during flight. It is customary practice to place light weight induction type pick-up devices, known as accelerometers, at the points on the aircraft to be subjected to vibration and flutter tests. The nature of the application demands that such a device have sufficient sensitivity combined with adequate ruggedness, yet be light in weight and be capable of being responsive to a wide range of frequencies and amplitudes. Such a device is shown and described in United States Patent No. 2,305,267, granted to Edward E. Minor and Stanley A. Kilpatrick, December 15, 1942, for use in accordance with a method of testing vibration of aircraft in flight as described in United States Patent No. 2,305,268, granted to the same inventors on December 15, 1942.

The complete coverage of flight conditions attainable by this device and method has led to its wide adoption in the aircraft industries. However, in conducting flight tests in accordance with these practices, the accuracy of the record produced and its accurate interpretation afterward, depends upon the accuracy of the means of calibration of the accelerometer to provide a calibrating graph from which the amplitudes and frequencies of the record produced during the flight test are compared and accurately calculated into usable engineering data.

In the science of vibrating mechanics, it is well known that any periodic motion can be duplicated by the sum of a plurality of pure sine-wave or harmonic motions of appropriate frequencies and amplitudes. In order to calibrate an instrument to measure vibrating phenomena, it is in general not practical to duplicate the complex motion beforehand under controlled conditions, especially since it is not known before the measurement is made. However, a reliable calibration can be obtained by subjecting the instrument to known pure harmonic motions of appropriate frequency and amplitude and observing its response or indication. If the vibratory phenomena to be measured contain a plurality of components of several frequencies and amplitudes, the measuring instrument should be calibrated by exciting it at or near each of these component conditions. To accomplish this result, it is necessary that an accurate means be provided for obtaining a calibration of a vibration measuring instrument by subjecting it to a nearly perfect harmonic motion at a known amplitude and frequency. The vibrating devices now known are limited to mechanisms of the ordinary eccentric cam or toggle type which are capable of producing more or less violent vibratory motion useful in conducting fatigue tests or the mixing of materials. None of these mechanisms are capable of producing a pure sinusoidal motion necessary to efficiently calibrate the flight test equipment as outlined above.

The present invention provides a novel method and apparatus for calibrating vibration testing instruments wherein the apparatus includes a motor driven variable speed driving mechanism belted to a driving shaft positioned to rotate an eccentrically mounted disc inside of a frame-like structure referred to as a Scotch yoke so arranged as to absorb the horizontal motion of the disc and transmit the vertical thrust of said disc to a table on which is placed an instrument for test. The effect of the motion of the table on an instrument equipped with magnetic fields energized with a constant amplitude, high frequency, alternating electric current, serving as a carrier signal, is to modulate said carrier signal to conform to the controlled amplitude and frequency of such acceleration as an accelerometer signal. The relatively weak accelerometer signal is reinforced by being amplified and is then demodulated to recover the accelerometer signal from the carrier signal in a form suitable for recording on an oscillograph record.

It is among the objects of our invention to provide a device capable of developing a controlled pure harmonic sinusoidal motion for use in calibrating vibration measuring apparatus similar to that described and shown in United States Patent No. 2,305,267, granted to Edward E. Minor and Stanley W. Kilpatrick, December 15, 1942, and used in accordance with a method of testing vibrations of aircraft in flight as described in United States Patent No. 2,305,268, granted to the same inventors on December 15, 1942.

A further object of our invention is to provide a machine with a positive adjustment by which the harmonic amplitude transmitted to a calibrating table can be varied from zero to one inch at frequencies up to 2500 cycles per minute.

A still further object of our invention is to provide a calibrating device characterized by an external adjustment capable of positive positioning of an amplitude controlling rack and pinion.

Another object of our invention is to provide a harmonic motion producing apparatus capable of imparting a sinusoidal acceleration to an instrument attached thereto.

A further object of our invention is to provide a method of calibrating vibration measuring instruments by imparting thereto a controlled harmonic acceleration, energizing such an instrument with an electrical impulse known as a carrier signal, amplifying the resultant modulated signal, filtering out the carrier signal, and recording the amplitudes and frequencies of the remaining electrical impulses for comparison with records secured from said instrument during a previous operation.

Other objects of our invention will become apparent from the following description when taken in conjunction with the drawings in which like numbers refer to like parts in different views.

Figure 1:
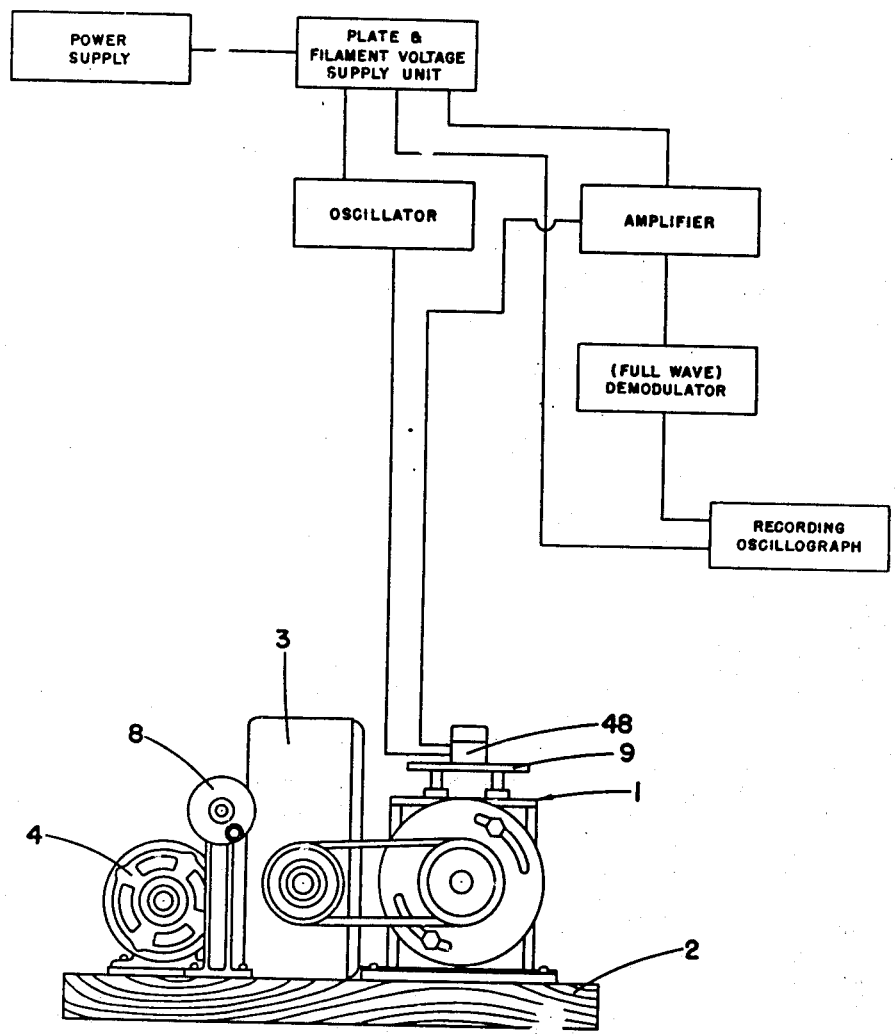
Figure 1 is a diagrammatic view showing the relationship of the calibrating device of our invention to the other parts of a recording circuit when used in calibrating a vibration pick-up unit.
Figure 2:
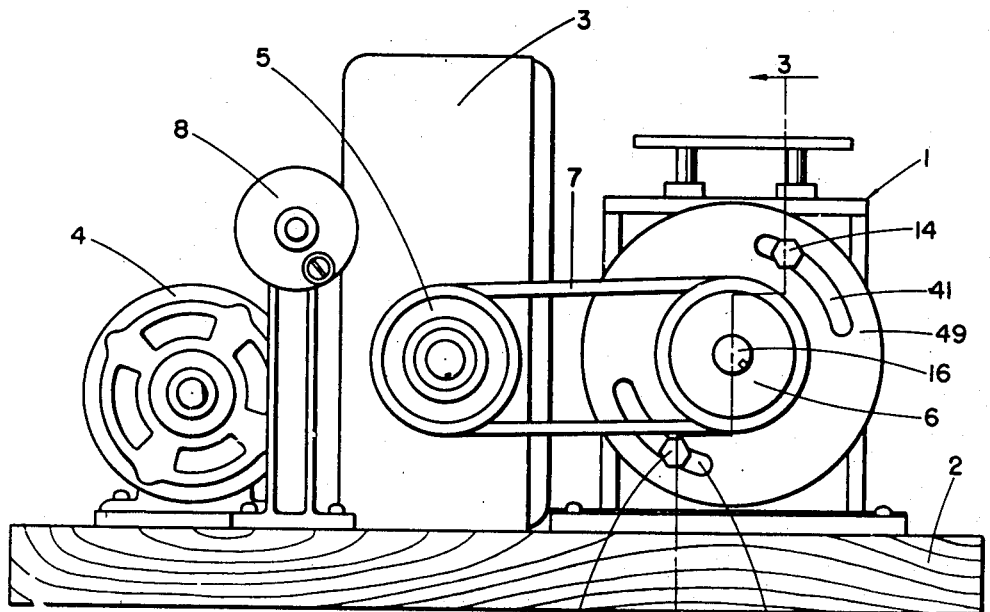
Figure 2 is an elevation of the calibrating device assembly.

Referring in detail to the drawings, the calibrating device 1 of our invention is mounted on base 2 with a conventional variable speed driving unit 3 which in turn is driven at a constant speed by electric motor 4, or a like driving mechanism. The controlled rotation of pulley 5 of the drive unit 3 is transmitted to the flanged pulley 6 of the calibrating device 1 by belt 7.

The speed of rotation at which drive pulley 5 rotates is determined by the selected ratio of the operating pulleys of the drive unit 3 when the unit is driven by a motor 4. The selection of the proper ratio for any predetermined speed within the range of the drive unit 3 is accomplished by movement of the ratio determining belt, or belts, of the unit by a selector fork (not shown) actuated through a gear and screw drive effected by rotation of hand wheel 8 located as shown outside of the unit. The position of the selector fork relative to the speed of rotation at which drive pulley 5 will rotate when the unit is driven by motor 4 is indicated by a graduated indicia on the outside of unit 3. Driving pulley 5 in turn rotates the flanged pulley 6 of the calibrating device through belt 7.

The pure sinusoidal motion delivered at the vibration transmitting member or table 9 results from the rotation of disc 10 (Figures 3 and 4) mounted to rotate inside of Scotch yoke 11 as rotatively driven by the hollow outer or main shaft 12, journalled in bearing 28, and formed with a squared end portion 12'. A sealing plate 44, secured in place by screws 45, is positioned around shaft 12 on the exterior of the housing to seal out foreign matter and prevent loss of oil.

Figure 4:
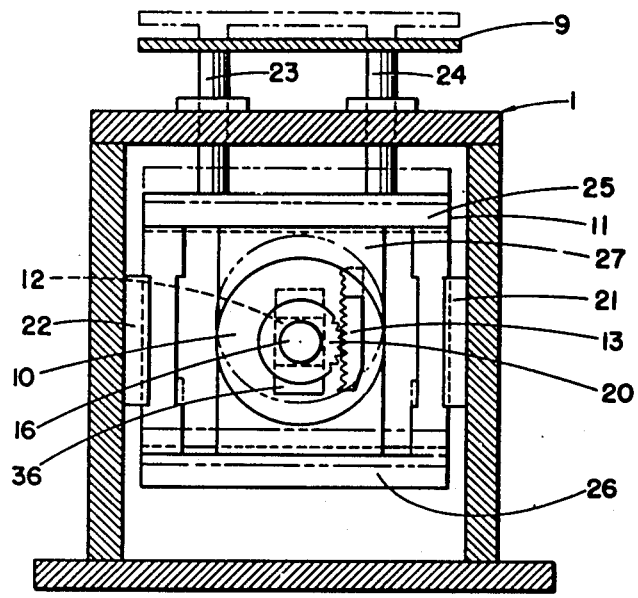
Figure 4 is a cross-sectional view of the calibrating device on the line 4—4 of Figure 3 showing assemblage of the amplitude adjusting rack.

Disc 10 is formed with a slot 36 extending outwardly from the axial center-line thereof, arranged to provide a slidable driving fit with the square end 12' of shaft 12. The radial movement of disc 10 relative to shaft 12 is accomplished by rotating pinion gear 20 in engagement with rack 13, affixed to disc 10 parallel to the slot 36. During operation of device 1 at neutral position, producing zero amplitude of motion, disc 10 is centered on shaft 12 as shown in Figure 4. For operation at maximum amplitude disc 10 is moved to full degree of eccentricity as shown by dotted lines (Figure 4). The component of the vertical thrust developed by the eccentrical rotation of disc 10 is utilized to move table 9, up and down, through movement of supports 23 and 24 extending from the top member 25 of Scotch yoke 11 to table 9. The conventional term "Scotch yoke" is used to describe the mechanism utilized to transform the radial thrust developed by the eccentricity of disc 10 into controlled sinusoidal vertical motion and consists of an apertured center member 27, or slidable blocks, mounted to wholly, or partially, encircle the disc and slide horizontally between a top member 25 and bottom member 26 of a rectangular frame mounted to slide vertically between vertical guides 21 and 22 (Figure 4). This arrangement provides for absorption of the component of the horizontal thrust developed in disc 10 by center member 27 as expended side motion without disturbing the sine of the vertical motion conveyed to the calibrating table 9 through supporting members 23 and 24. The main shaft 12 is rotated by a flywheel 40 attached to the end of said shaft adjacent grooved pulley 6. The flywheel 40 is adjustably secured to the flanged pulley 6 by screws 14 and 15 so as to provide for their rotation together as a unit during the calibrating operation. Rotatively mounted inside of said hollow main shaft 12 is an inner adjusting shaft 16 of sufficient length to extend through the hollow main shaft 12 and provide one end journalled in bearing 17, supported by side wall member 18 of the housing, and have the opposite end protrude axially beyond said main shaft 12 sufficiently to provide for attachment of flanged pulley 6, secured by securing nut 19. Attached to the journalled end of inner shaft 16 is a pinion gear 20 positioned to engage with amplitude adjusting rack 13 attached to disc 10 positioned inside the Scotch yoke 11. The amplitude of motion conveyed to table 9 is controlled by increasing and decreasing the degree of eccentricity of disc 10 as determined by the position of amplitude adjusting rack 13. Movement of rack 13 is attained by the rotation of pinion gear 20 by angular rotation of inner shaft 16 relative to main shaft 12. This adjustment is externally accomplished by releasing and rotating the flanged pulley 6 relative to the flywheel 13, and the adjustment so established, for a given amplitude, is maintained by securing the flanged pulley 6 to the flywheel 40 by tightening locking screws 14 and 15 positioned in slots 41 and 42 of the flange of said pulley. The flywheel 40 is provided with a graduated scale 37 marked on the outside periphery thereof by which the operator determines the setting of the mechanism for the development of a desired amplitude of motion at table 9. The device to be calibrated is attached to table 9 by studs, or like securing means.

An end closure 46 secured to the outside of the housing by screws 47 is used to seal the end of the shaft 16 and the bearing 17 against injury and loss of lubricant from the device.

Figure 3:
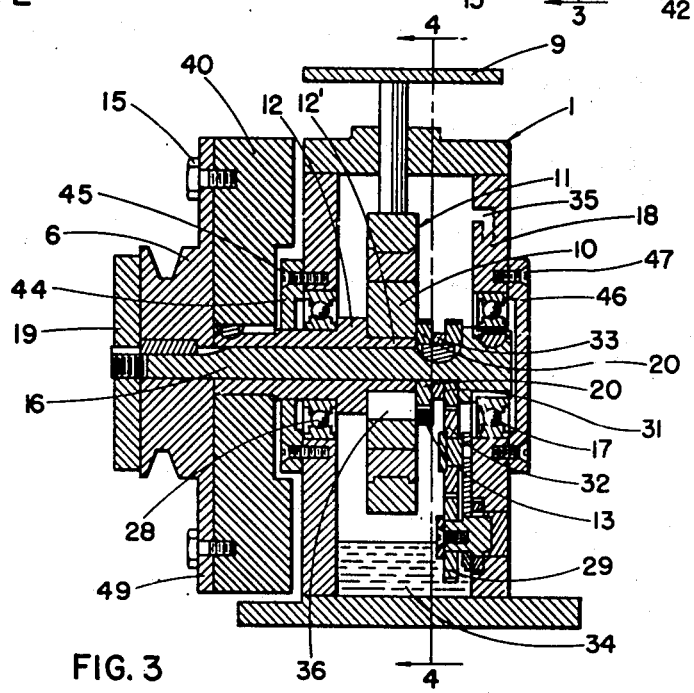
Figure 3 is a cross-sectional view of the calibrating device on the line 3—3 of Figure 2.

In order to provide a continuous supply of oil to the bearing surfaces and moving parts a gear driven oil pump 29 is provided as positioned below the oil level 34 in the bottom of the housing (Figure 3). Oil pump 29 is driven by gear 31 mounted on end of shaft 16 separated from adjusting gear 20 by separator 33 through intermediate gear 32. The oil maintained under pressure from oil pump 29 is forced through oil duct 35 formed in wall 18 of the housing to provide a constant spray of oil to the moving parts.

Figure 5:
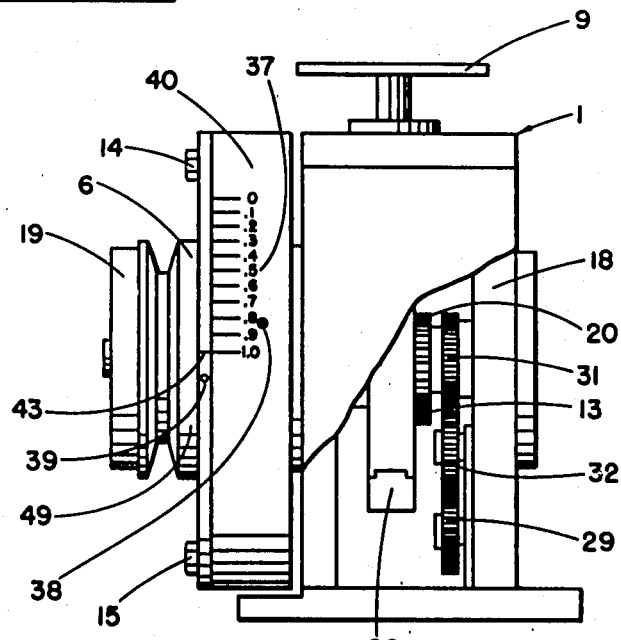
Figure 5 is an end view of the calibrating device showing flywheel marked with amplitude scale.

To adjust the amplitude of the calibrating table the flywheel is rotated so that the graduated scale 37, which reads in double amplitude, is on top. A rod, or like tool, is inserted in aperture 38 provided in flywheel 40 and a similar rod is inserted in socket 39 provided in the adjusting face plate 49 shown as an extension of the outer rim of pulley 6. The two locking cap screws 14 and 15 and tightening nut 19 are loosened so as to provide for movement between the flanged pulley 6 and flywheel 40. The flywheel 40 is held and pulley 6 in its loosened condition is adjusted to the desired amplitude as shown by scale 37 on flywheel 13 aligned with marking 43 on adjusting face plate 49. The adjustments are always to be made from higher to lower amplitudes. For example, if the calibration on the flywheel 40 shows that the mechanism is set for an amplitude of .4" and it is to be adjusted to .8", rotate the pulley 6 to an amplitude greater than .8" (see Fig. 5), then make the adjustment from a higher to a lower setting as indicated by the scale 37 on said flywheel 40. The two locking screws 14 and 15 are then tightened and the tightening nut 19 is tightened to hand pressure tightness. This locks the adjustment for operation at the selected amplitude of motion to be developed at table 9. The procedure of adjusting from higher to lower amplitude insures a high degree of accuracy of setting due to the fact that it removes the back lash normally present between pinion gear 20 and adjusting rack 13.

Adjustment of the frequency of the calibrating table cycle is accomplished by varying the relative diameter of the pulleys inside the variable speed speed unit 3 by positioning the adjusting fork by rotating hand wheel 8. Changes in the frequency setting of the variable drive unit should only be made while the unit is running so as to assure a positive setting as indicated by the speed indicator incorporated in the unit.

The method of calibration hereinafter described consists of recording the electrical response produced when a pick-up device commonly referred to and known as an accelerometer is subject to a known or controlled motion, velocity, or acceleration, while energized by an electrical current as a carrier signal from which an oscillographic recording is taken on an independent timing reference used to determine the exact frequencies and amplitudes of oscillations obtained at the accelerometer during the calibrating operation. In this procedure it is recommended that the accelerometer unit 48 is rigidly attached to the calibrating table 9 and electrically connected as shown in the Figure 1. The purpose of the power supply, plate and filament voltage supply unit, and oscillator hook-up is to supply an alternating current at audio-frequency to the accelerometer unit 48. This impressed frequency is referred to as the oscillator signal and serves as the carrier signal. When the accelerometer is vibrated by table 9, to which it is attached, the accelerations cause a modification in the electrical current being passed through the accelerometer corresponding to the amplitudes and frequencies at which the calibrating table is vibrated. The sine-wave of the table motion being sinusoidal in form permits a ready accurate calibration; whereas, a non-sinusoidal motion would give a distorted modulated accelerometer signal requiring allowance and calculation for error between the test graph originally produced and the calibrated graph. The low frequency sine-wave of the table motion characterized by a controlled amplitude and frequency forms a modulated high frequency carrier signal referred to as the accelerometer signal. The modulated accelerometer signal represents a true reproduction of the effect of the mechanical acceleration upon the electric circuit of the accelerometer in wave form. The accelerometer signal is then amplified and demodulated in the customary manner for oscillographic recording.

The calibrating table of our invention permits of double amplitude adjustment from zero to one inch and in the combination herein disclosed can be operated at frequencies up to 2500 cycles per minute and has a load capacity of + or − twenty pounds which is equivalent to ± 20 g. on an instrument weighing one pound or ± 80 g. on an instrument weighing four ounces. In calibrating an instrument attached to the table 9 and connected as shown in Figure 1 the amplitude or desired table motion is first determined. This may be either the maximum amplitude, to which the instrument is to be subjected or has been subjected, or any other maximum indicated. The eccentricity of disc 10 is increased or decreased as shown necessary by adjustment of the flange 8 relative to the fly wheel 40 as previously described. The electric motor 4, or like driving means, is then energized bringing the speed drive unit 3 up to the maximum desired frequency previously determined by calculation. The oscillographic recording device is then placed in operation and at the same time variable speed driving unit 3 is adjusted by turning hand wheel 8 gradually to its minimum speed position. The motor 4, or like driving means, is then turned off and the flywheel is allowed to coast to a stop, after which the recording equiment is deenergized. The oscillographic record so obtained will give a complete record of the response of the accelerometer to the accelerations so imparted to it, from maximum determined frequency to zero frequency for a given amplitude. In this form the record so produced is compared with the original oscillographic record secured of the response of the accelerometer to the acceleration imparted to it during the flight test.

Analysis of the record so obtained in accordance with the following equations will give a complete calibration of the accelerometer and provide an accurate determination of the magnitude and frequency of the vibrations encountered during the flight test.

Since the Scotch yoke eccentric mechanism of our calibrating device develops pure sinusoidal motion the displacement of the table 9, designated as "$x$" in this equation, at any time is:

$$x = x_0 \cos 2\pi ft$$

where $x_0$ is the single amplitude, $f$ the frequency in cycles per second, and $t$ the time in seconds. The peak displacement occurs when $\cos 2\pi ft$ is a maximum and equal to unity, in which case $x = x_0$ The velocity of the table at any instant of time is then $$v = \frac{dx}{dt} = -x_0(2\pi f) \sin \pi ft$$

Similarly, the acceleration at any time is:

$$a = \frac{dv}{dt} = \frac{d^2x}{dt^2} = -x_0(2\pi f)^2 \cos 2\pi ft$$

The peak acceleration occurs when $\cos 2\pi ft$ is a maximum and equal to unity, whence $$a = a_0 = -x_0(2\pi f)^2$$

Thus, it has been shown that the peak acceleration developed by the table 9 is proportional to the amplitude of motion at the table, and to the square of the frequency of oscillation.

As other embodiments and variations may be made of our invention, and as changes may be made in the embodiment hereinbefore described, it will be understood that all matter described herein or shown in the accompanying drawings is to be interpreted as illustrative only and not in the limiting sense.

We claim:

1. A calibrating device capable of producing motion of sinusoidal form of variable amplitude including a housing, a vibrating table, and table vibrating means, comprising a slotted disc having a rack attached thereto, and positioned to rotate within a Scotch yoke having horizontal and vertical guide members, supporting members positioned to support the vibrating table on the top member of said Scotch yoke, an outer shaft journalled to be rotated by energy transmitted through an attached flywheel, said shaft being adapted to rotate said disc, an inner shaft mounted to rotate angularly within said shaft, a pulley having a slotted flange attached to said inner shaft adjacent said flywheel and secured thereto by adjustable securing means for positioning the flange relative to the flywheel and a gear secured to the inner shaft positioned to engage said rack to afford external adjustment of the eccentricity of the slotted disc relative to said Scotch yoke.

2. A calibrating device capable of producing motion of sinusoidal form of variable amplitude including a housing, a vibrating table, table vibrating means comprising a Scotch yoke consisting of a rectangular frame slidably mounted for vertical movement and having an apertured center member slidably mounted for horizontal movement, a disc having a slot transversely centered relative to the radial center of said disc as positioned to rotate within the aperture of said center member at varying degrees of eccentricity and having a rack attached to said disc parallel to said slot, supporting members positioned to support the vibrating table on the top cross member of said Scotch yoke, an outer shaft journalled transversely to the Scotch yoke and adapted to rotate said disc within the Scotch yoke, a flywheel mounted on said outer shaft, an inner shaft mounted to be rotated angularly within said shaft, a pulley mounted on said inner shaft adjacent the flywheel on said outer shaft and adapted to be secured to said flywheel by adjustable securing means for angularly positioning said pulley relative to the flywheel, a gear secured to the inner shaft and positioned to engage said rack to afford external adjustment of the eccentricity of the slotted disc relative to said Scotch yoke.

3. A calibrating device capable of producing motion of sinusoidal form of variable amplitude including a housing, a vibration member and vibrating means associated with said vibration member comprising a disc positioned in a Scotch yoke having horizontal and vertical guide members, said disc having attached thereto an adjusting rack, an outer shaft journalled to be rotated by energy transmitted through an attached flywheel, said shaft being positioned to rotate said disc adjustably mounted on said shaft, an inner shaft mounted and journalled to rotate within said outer shaft, a pulley attached to the inner shaft adjacent said flywheel attached to the outer shaft and provided with a slotted flange and adjustable securing means for positioning the flange relative to the flywheel, a gear secured to the inner shaft and positioned to engage the rack to afford external adjustment of the eccentricity of the disc relative to said Scotch yoke.

4. A vibrating device including a housing, a vibrating table, table vibrating means comprising an eccentrically rotatable disc, supporting members for supporting the vibrating table, a movable frame for conveying vibrations developed by rotation of said disc to the vibrating table supports, a rack attached to said disc, a gear positioned to engage said rack, a drive shaft positioned to rotate said disc, a shaft positioned to rotate said gear in engagement with said rack by which the degree of eccentricity relative to the axial centerline of the drive shaft can be varied and securing means by which the relative positions of the gear and rack may be secured.

5. A vibrating device capable of producing motion of sinusoidal form of variable amplitude including a housing, a vibrating table, table vibrating means comprising a slotted disc having a rack attached thereto, and positioned to rotate within a Scotch yoke having horizontal and vertical guide members, supporting members positioned to support the vibrating table on the top member of said Scotch yoke, an outer shaft journalled to be rotated by energy transmitted through an attached flywheel, said shaft being adapted to rotate said disc, an inner shaft mounted to rotate angularly within said shaft, a pulley having a slotted flange attached to said inner shaft adjacent said flywheel and secured thereto by adjustable securing means for positioning the flange relative to the flywheel, and a gear secured to the inner shaft positioned to engage said rack to afford external adjustment of the eccentricity of the slotted disc relative to said Scotch yoke.

6. A vibrating device including a housing, a vibration transmitting member connected to vibration producing means comprising an eccentrically rotatable disc, supports for supporting the vibration transmitting member, a movable frame for conveying vibrations developed by rotation of said disc to the transmitting member supports, a rack attached to said disc, a gear positioned to engage said rack, a drive shaft positioned to rotate said disc, a shaft positioned to rotate said gear in engagement with said rack by which the degree of eccentricity relative to the axial centerline of the drive shaft can be varied, and securing means by which the relative positions of the gear and rack may be secured.

WELCOME W. BENDER, JR.
WILLIAM B. BERGEN.
WILLIAM G. PURDY.

REFERENCES CITED

The following references are of record in the file of this patent:

UNITED STATES PATENTS

| Number | Name | Date |
|---|---|---|
| 1,336,322 | Steere | Apr. 6, 1920 |
| 1,560,435 | Sperry | Nov. 3, 1925 |
| 1,661,323 | Crosthwait | Mar. 6, 1928 |
| 1,803,458 | Berry | May 5, 1931 |
| 1,868,498 | Gruman | July 26, 1932 |
| 2,288,963 | Von Tavel | July 7, 1942 |
| 2,398,520 | Clements | Apr. 16, 1946 |
| 2,422,933 | Small | June 24, 1947 |

FOREIGN PATENTS

| Number | Country | Date |
|---|---|---|
| 225,771 | Great Britain | Dec. 11, 1924 |